United States Patent [19]

Elliott

[11] 4,402,918
[45] Sep. 6, 1983

[54] RECLAMATION PROCESS FOR WATER-BORNE URANIUM

[75] Inventor: Henry H. Elliott, Pleasanton, Calif.

[73] Assignee: General Electric Company, San Jose, Calif.

[21] Appl. No.: 219,376

[22] Filed: Dec. 22, 1980

[51] Int. Cl.³ .............................................. C01G 43/00
[52] U.S. Cl. .......................................... 423/7; 423/15; 423/18; 423/20
[58] Field of Search ........................ 423/7, 15, 18, 20; 210/682, 670, 672

[56] References Cited

U.S. PATENT DOCUMENTS

| | | | |
|---|---|---|---|
| 3,937,783 | 2/1976 | Wamser | 423/18 |
| 3,961,027 | 6/1976 | Crossley | 423/7 |
| 3,988,757 | 9/1976 | Dokuzoguz | 423/15 |
| 4,233,272 | 11/1980 | Eresen | 423/7 |
| 4,298,578 | 11/1981 | Yan | 423/7 |

FOREIGN PATENT DOCUMENTS 2627540 1/1978 Fed. Rep. of Germany .......... 423/7

OTHER PUBLICATIONS

Egawa et al. in *Chemical Abstracts*, vol. 91 (1979), No. 126605y.

*Primary Examiner*—Brian E. Hearn
*Attorney, Agent, or Firm*—Ivor J. James, Jr.; Raymond G. Simkins; Samuel E. Turner

[57] ABSTRACT

A process for treating water containing chemicals comprising ammonium nitrate, fluorides, hydrogen peroxide and uranium compounds, wherein valuable and/or hazardous components of the chemicals-containing water are separated therefrom and concentrated for recovery. The process includes an ion exchange operation in addition to manipulations of chemical components and pH conditions of the water by means of the application of reagents and adsorbents.

28 Claims, 1 Drawing Figure

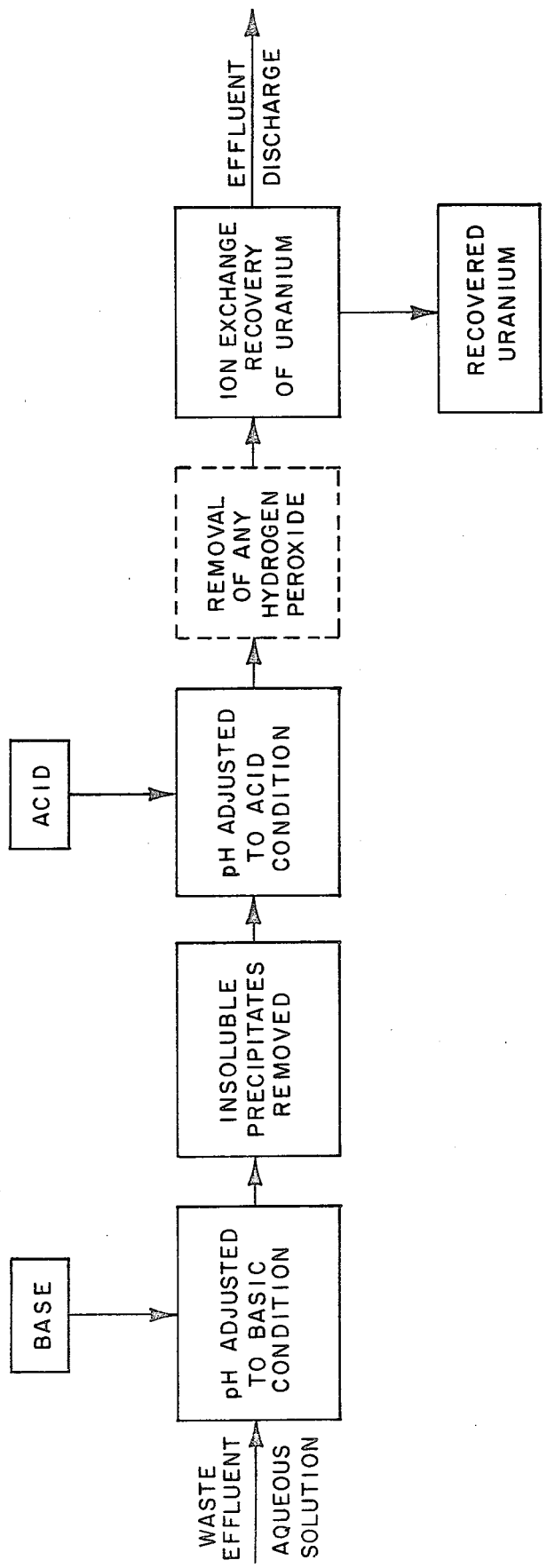

RECLAMATION PROCESS FOR WATER-BORNE URANIUM

BACKGROUND OF THE INVENTION

1. Field of the Invention

This invention relates to a chemical process for recovering uranium, among other potentially useful or valuable materials, from ammonium nitrate-containing water or waste effluent. The method is particularly useful in procedures for converting impure uranium dioxide to uranium dioxide of a grade suitable for use as fuel for nuclear fission reactors.

2. Description of the Background Art

One conventional means of producing fission fuel grade uranium dioxide consists of a wet conversion procedure, comprising the steps or reactions of: (a) hydrolyzing gaseous uranium hexafluoride ($UF_6$) with water to form water soluble uranyl fluoride ($UO_2F_2$) and hydrogen fluoride; (b) introducing ammonium ions, such as by the addition of an excess of ammonium hydroxide, to cause the soluble uranyl fluoride to precipitate as insoluble ammonium diuranate (($NH_4)_2U_2O_7$); and, (c) upon separation of said insoluble precipitate from the water fraction, heating the ammonium diuranate to drive off entrained fluorides with ammonia and thereby convert the diuranate to uranium dioxide ($UO_2$).

This basic uranium conversion process is disclosed in detail in the prior art, for example U.S. Pat. Nos. 3,394,997 and 3,579,311, and the disclosures and contents of said patents are incorporated herein by reference.

In the production of uranium dioxide nuclear fuel pellets, a substantial quantity of uranium dioxide fuel stock powder and some scrap or broken pellets are routinely recycled for reasons of economy and environmental protection. Recycling of the uranium dioxide materials is carried out by dissolving the solid uranium dioxide material in nitric acid, and thereby forming a solution of soluble uranium nitrate. The pH of a water-diluted solution of the soluble uranium nitrate is reduced to about 5 to about 7 with ammonium hydroxide, and then the uranium is precipitated from the solution by the addition of hydrogen peroxide to produce insoluble uranium peroxide according to the reaction:

$$UO_2(NO_3)_2 + 2H_2O + H_2O_2 \rightarrow UO_4 \cdot 2H_2O + 2HNO_3$$

Insoluble uranium peroxide is removed in a dewatering centrifuge or other solid-liquid separating means, and then calcined to form uranium dioxide powder for reuse in the production of fissionable fuel pellets. The supernatant or effluent liquid from the solids-liquid separation is passed through a clarifier to a nitrate holding tank where lime ($Ca(OH)_2$) is added for further purification including precipitating fluorides as insoluble calcium fluoride.

The effluent from the peroxide precipitation procedure comprises ammonium nitrate, peroxides, fluorides, and other assorted impurities as well as a residue of soluble and insoluble uranium compounds. The uranium compounds are typically present in the effluent in amounts sufficient to warrant recovery thereof on the basis of economics. The substantial value of any recovered uranium and/or avoidance of the high costs of safely disposing of voluminous quantities of material containing radioactive uranium justify recovery costs.

SUMMARY OF THE INVENTION

This invention comprises the treatment of water containing ammonium nitrate, hydrogen peroxide, fluorides and uranium compounds, among other possible constituents, by the steps or operations of: (1) introducing a hydroxide of a cation that will form relatively insoluble compositions with the fluorides; (2) removing the precipitate formed thereby; (3) acidifying the remaining solution to convert complex forms of uranium to a soluble uranyl nitrate; and (4) chelating the uranyl ions onto a suitable ion exchange material for recovery.

OBJECTS OF THE INVENTION

It is a primary object of this invention to provide an effective process for recovering uranium from a water medium.

It is also a primary object of this invention to effectively eliminate uranium from or minimize uranium present in process effluents or waste waters.

It is an additional object of this invention to reduce nuclear fuel manufacturing costs by an effective and economical process for reclaiming expensive uranium from water.

It is another object of this invention to reduce the potential hazards of handling, discharging or storing radioactive uranium, or of pollution attributable thereto.

It is still another object of this invention to provide a means for avoiding the expense of storing or providing apt waste disposal facilities for large volumes or quantities of radioactive process effluent.

DESCRIPTION OF THE DRAWING

The drawing comprises a simplified block diagram illustrating the basic steps of the process of the present invention.

DETAILED DESCRIPTION OF THE INVENTION

This invention provides for the effective and economical recovery of uranium, as well as other ingredients, from an ammonium nitrate-containing aqueous medium by means of the hereinafter described process.

In accordance with a typical and preferred embodiment of this invention, water containing ammonium nitrate, hydrogen peroxide, fluorides and uranium compounds, such as the water effluent produced by established procedures for converting uranium nitrate to uranium peroxide, is treated to adjust the pH thereof to a basic condition of greater than about 8, or within a preferred basic pH range of about 8 to about 9. An increase in the pH of the ammonium nitrate-containing water to the required level is attained by the addition thereto of an alkali material comprising alkaline earth metal hydroxides such as calcium hydroxide or magnesium hydroxide, alkali metal hydroxides such as sodium hydroxide, or ammonium hydroxide. Carbonates and bicarbonates of such metals or ammonia can also be used.

Calcium hydroxide ($Ca(OH)_2$) is a preferred agent for the pH adjustment, especially if significant amounts of fluorides are present in the water. The use of lime (CaO) precipitates any soluble fluorides present as insoluble calcium fluoride ($CaF_2$) and also precipitates soluble iron compounds as ferric hydroxides ($Fe(OH)_3$). Ammonium hydroxide precipitates iron only as ferric hydroxides. Any iron present in the water must be removed to preclude its deleterious effects in the presence of soluble fluorides upon ion exchange materials utilized in a subsequent step of the process. Sodium hydroxide is marginally effective in precipitating out fluorides because sodium fluoride is slightly soluble in water. Carbonates are equally effective as the hydroxides, but lead to carbon dioxide evolution during initial addition.

By-products, such as precipitated calcium fluoride, can be treated for further uranium recovery by conventional means.

The thus precipitated fluoride compounds, and any iron precipitates or other insolubles are removed from the liquid phase by any suitable means including filtering, centrifuging, or simply settling.

The resultant water solution containing trace quantities of uranium among other possible components, with a basic pH higher than about 8, is then acidified to the extent of lowering the pH to less than about 6, and preferably to within a range of about 5 to about 4, by the addition thereto of a mineral acid such as nitric acid. This acidification decomposes any of the water-contained ammonium bicarbonate ($NH_4HCO_3$), calcium hydroxide and calcium carbonate ($CaCO_3$) to form carbon dioxide, calcium nitrate ($Ca(NO_3)_2$) and ammonium nitrate ($NH_4NO_3$), in addition to converting uranium compounds present to uranyl nitrate ($UO_2(NO_3)_2$).

The acidified water solution containing soluble uranyl nitrate is then passed into contact, in a suitable bed or other apt arrangement, with a chelating ion exchange material having at least one amidoxime group

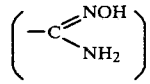

thereon, and charged with ammonium cations. An example of a commercially available ion exchange material suitable for the practice of this invention is Diamond Shamrock's "Duolite CS-346", a macroporous chelating resin comprising a crosslinked copolymer in spherical form containing chelate functionality.

The uranyl ions ($UO_2^{++}$) are chelated onto the resin exchange material in exchange with the ammonium ions. Ammonium nitrate and calcium nitrate present do not interfere with the uranium loading or exchange. The soluble uranium is effectively separated from the remaining components in water solution.

Thereafter the separated uranyl ions are removed or eluted from the chelating exchange material by contacting the material with a strong mineral acid such as nitric acid. The eluate consisting of uranium nitrate ($UO_2(NO_3)_2$) concentrate is thus recovered, and it can be recycled into a uranium peroxide conversion system for the transforming of uranium nitrate to uranium dioxide, or otherwise disposed of.

Regeneration or reactivation of the chelating exchange material for further cycles of use in chelating uranyl ions can be effected by contacting the material with an ammonium nitrate solution. An economical source of such a solution comprising ammonium nitrate for regeneration is the effluent from the exchange and chelating action occurring upon contact of uranyl nitrate containing water with the ammonium ion-charged exchange material.

The uranium bearing aqueous solution typically contains minor quantities of hydrogen peroxide. Since hydrogen peroxide has a detrimental effect upon the exchange material's functional group, it must be removed or decomposed at some period prior to the ion exchange step or function.

Hydrogen peroxide can be effectively removed or destroyed by absorbing the stabilizer, if any, included for its preservation in commercial supplies. Acetyl phenetidin or sodium stannate are commonly used as stabilizers. Activated carbon can be used to absorb such stabilizing materials. Decomposition of the hydrogen peroxide can then be effected by heating to a temperature of about 100° to about 120° F. Alternately, the hydrogen peroxide can be decomposed by contacting it for a sufficient time with a catalyst, such as iron.

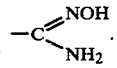

What is claimed is:

1. A process for treating an aqueous solution including ammonium nitrate, fluorides and uranium compounds and recovering uranium therefrom, consisting essentially of the combination and sequence of steps of:
    (a) adjusting the pH of the aqueous solution with its contents to a basic condition of higher than about 8 to thereby precipitate out the fluorides, and removing therefrom any insolubles including precipitates induced by said pH adjustment;
    (b) acidifying the basic solution with its contents of remaining solubles to a pH of lower than about 6 to thereby convert the uranium to a soluble uranyl compound;
    (c) contacting the acidified solution and its contents comprising the soluble uranyl compound with an ion exchange material having at least one amidoxime group therein, and thereby removing and retaining thereon ions comprising uranium from the acidified solution; and,
    (d) recovering uranium from the ion exchange material by contacting said material with an acid.

2. The process of claim 1, wherein the pH of the aqueous solution with its contents is adjusted to a basic condition of higher than about 8 by the addition thereto of at least one alkali selected from the group consisting of a hydroxide, carbonate or bicarbonate of an alkaline earth metal, alkali metal and ammonia, and mixtures thereof.

3. The process of claim 2, wherein the alkali is calcium hydroxide.

4. The process of claim 2, wherein the alkali is ammonium hydroxide.

5. The process of claim 2, wherein the alkali is sodium hydroxide.

6. The process of claim 2, wherein the alkali is magnesium hydroxide.

7. The process of claim 2, wherein the alkali is at least one carbonate or bicarbonate selected from the group consisting of calcium, magnesium, sodium and ammonia, and mixtures thereof.

8. The process of claim 1, wherein the basic solution with its contents is acidified to a pH of less than about 6 with a mineral acid.

9. The process of claim 6, wherein the mineral acid is nitric acid.

10. The process of claim 1, wherein ions comprising uranium retained on the ion exchange material are removed therefrom by contact with a mineral acid.

11. The process of claim 10, wherein the mineral acid is nitric acid.

12. The process of claim 1, wherein any hydrogen peroxide present in the solution being treated is decomposed prior to contacting the solution and its contents with the ion exchange material.

13. A process for treating an aqueous solution including ammonium nitrate, fluorides and uranium compounds, and recovering uranium therefrom, consisting essentially of the combination and sequence of steps of:
(a) adjusting the pH of the aqueous solution with its contents to a basic condition of higher than about 8 by the addition thereto of an alkali to thereby precipitate out the fluorides, and removing therefrom any insolubles including precipitates formed by said pH adjustment;
(b) acidifying the basic solution with its contents of remaining solubles to a pH of at least about 5 with mineral acid to thereby convert the uranium to a soluble uranyl salt;
(c) eliminating any hydrogen peroxide contained in the solution;
(d) contacting the acidifed solution and its contents comprising the soluble uranyl salt with a chelating ion exchange material having at least one amidoxime group therein, and thereby removing from the acidified solution and retaining on said ion exchange material ions comprising uranium; and
(e) recovering uranium from the ion exchange material by contacting said material with mineral acid.

14. The process of claim 13, wherein the pH of the aqueous solution with its contents is adjusted to a basic condition of higher than about 8 by the addition thereto of at least one alkali selected from the group of hydroxides, carbonates and bicarbonates of calcium, magnesium, sodium and ammonium, and mixtures thereof.

15. The process of claim 13, wherein the alkali is calcium hydroxide.

16. The process of claim 13, wherein the alkali is magnesium hydroxide.

17. The process of claim 13, wherein the basic water with its contents is acidified to a pH of at least about 5 with nitric acid.

18. The process of claim 13, wherein ions comprising uranium retained on the ion exchange material are removed therefrom by contact with nitric acid.

19. The process of claim 13, wherein any hydrogen peroxide present in the solution being treated is eliminated therefrom prior to contacting the solution and its contents with the ion exchange material.

20. The process of claim 19, wherein the hydrogen peroxide is eliminated by decomposition.

21. The process of claim 20, wherein the decomposition of hydrogen peroxide is facilitated by absorbing the stabilizer therefor on activated carbon.

22. The process of claim 20, wherein the decomposition of hydrogen peroxide is facilitated by subjecting the peroxide to a metal catalyst selected from the group consisting of iron and copper, and high temperatures.

23. The process of claim 13, wherein the chelating ion exchange material comprises a crosslinked macroporous acrylic polymer having amidoxime groups of the formula

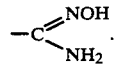

24. A process for treating an aqueous solution including ammonium nitrate, fluorides and uranium compounds, and recovering uranium therefrom, consisting essentially of the steps of:
(a) adjusting the pH of the aqueous solution with its contents to a basic condition of higher than about 8 by the addition thereto of at least one alkali selected from the group consisting of hydroxides, carbonates and bicarbonates of calcium, magnesium, sodium and ammonia, and mixtures thereof, to thereby precipitate out fluoride as an insoluble, and removing from the water any insolubles including precipitates formed by said pH adjustment;
(b) acidifying the basic solution with its contents of uranium solubles to a pH of at least about 5 with nitric acid to thereby convert the uranium to uranyl nitrate;
(c) contacting the acidified solution and its contents including the uranyl nitrate with a chelating ion exchange material having at least one amidoxime group thereon, and thereby removing the acidified solution and retaining on said ion exchange material uranyl ions form the uranyl nitrate; and
(d) recovering uranyl ions from the ion exchange material by contacting said material with nitric acid.

25. The process of claim 24, wherein any hydrogen peroxide present in the solution being treated is eliminated therefrom prior to contacting the acidfied solution and its contents with the ion exchange material.

26. A process for treating an aqueous solution including ammonium nitrate, fluoride compounds and uranium compounds, and recovering uranium therefrom, consisting essentially of the steps of:
(a) adjusting the pH of the aqueous solution with its contents to a basic condition of higher than about 8 by the addition thereto of calcium hydroxide to thereby precipitate out fluorides as insoluble calcium fluoride and any iron as an insoluble hydroxide, and removing from the solution insolubles including the precipitated calcium fluoride and any hydroxide of iron;
(b) acidifying the basic solution with its contents of remaining solubles to a pH of about 5 to about 4 with nitric acid to thereby convert the uranium to uranyl nitrate;
(c) contacting the acidified solution and its contents including the uranyl nitrate with a chelating ion exchange material having at least one amidoxime group thereon and charged with ammonia cations, and thereby removing from the acidified soluton and retaining on said ion exchange material the uranyl ions from the uranyl nitrate; and
(d) recovering uranyl ions from the ion exchange material by contacting said material with nitric acid.

27. The process of claim 26, wherein any hydrogen peroxide present in the solution being treated is eliminated therefrom prior to contacting the acidified solution and its contents with the ion exchange material.

28. The process of claim 26, wherein the chelating ion exchange material comprises a crosslinked macroporous acrylic polymer having amidoxime groups of the formula